US006871135B2

(12) United States Patent
Wolber et al.

(10) Patent No.: US 6,871,135 B2
(45) Date of Patent: Mar. 22, 2005

(54) METHOD FOR OPERATING AN INTERNAL COMBUSTION ENGINE, THE INTERNAL COMBUSTION ENGINE AND A CONTROL APPARATUS THEREFOR

(75) Inventors: Jens Wolber, Gerlingen (DE); Thomas Frenz, Noerdlingen (DE); Karsten Hinn, Giessen (DE); Timm Hollmann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/687,871

(22) Filed: Oct. 20, 2003

(65) Prior Publication Data

US 2004/0083048 A1 Apr. 29, 2004

(30) Foreign Application Priority Data

Oct. 18, 2002 (DE) ........................................ 102 48 627

(51) Int. Cl.[7] ................................................ G06F 19/00

(52) U.S. Cl. ....................... 701/114; 701/102; 701/107; 701/115; 123/387; 123/382; 123/406.17; 123/406.22; 73/117.3; 73/118.2

(58) Field of Search ................................ 701/114, 102, 701/107, 115; 73/117.3, 118.2; 123/387, 382, 406.17, 406.22

(56) References Cited

U.S. PATENT DOCUMENTS

| | | | | | |
|---|---|---|---|---|---|
| 6,651,491 | B2 | * | 11/2003 | Saito et al. | 73/117.3 |
| 6,691,023 | B2 | * | 2/2004 | Fujino et al. | 701/114 |
| 6,754,611 | B2 | * | 6/2004 | Nagashima et al. | 702/183 |
| 2004/0074453 | A1 | * | 4/2004 | Roelle et al. | 123/26 |

* cited by examiner

*Primary Examiner*—Willis R. Wolfe
*Assistant Examiner*—Johnny H. Hoang
(74) *Attorney, Agent, or Firm*—Walter Ottesen

(57) ABSTRACT

The invention is directed to a method for operating an internal combustion engine (1) wherein a fault of a pressure system with a pressure sensor (14) is determined by a first diagnostic system (14') of the engine (1). The pressure sensor (14) is especially a pressure sensor of a high pressure fuel system of the engine. For a plausibility consideration of a pressure system fault, which is determined by the first diagnostic system (14'), at least one further diagnostic system (18') of the engine (1) is checked as to a second fault.

19 Claims, 2 Drawing Sheets

METHOD FOR OPERATING AN INTERNAL COMBUSTION ENGINE, THE INTERNAL COMBUSTION ENGINE AND A CONTROL APPARATUS THEREFOR

FIELD OF THE INVENTION

The invention relates to a method for operating an internal combustion engine wherein a fault of a pressure system of the engine with a pressure sensor is determined by a first diagnostic system of the engine. The pressure system is especially a high pressure fuel system. The invention further relates to an internal combustion engine wherein a fault of a pressure system having a pressure sensor (especially a high pressure fuel system) of the engine is determined by a diagnostic system of the engine. The invention also relates to a control apparatus for the engine. Finally, the invention relates also to a computer program for a control apparatus of an internal combustion engine.

BACKGROUND OF THE INVENTION

An operating method of the above kind from the state of the art supplies insufficient data as to a fault within the pressure system and furthermore permits a plausibility observation only to a limited extent.

SUMMARY OF THE INVENTION

In view of the above, it is an object of the invention to provide an operating method of the kind described above as well as an internal combustion engine and a control apparatus which is improved so that a clear and more reliable diagnosis of the pressure system is possible.

The method of the invention is for operating an internal combustion engine including a pressure system, a first diagnostic system and a second diagnostic system. The method includes the steps of: determining a fault of the pressure system having a pressure sensor with the first diagnostic system; and, checking at least the second diagnostic system as to a second fault as a consequence of the pressure system fault determined with the first diagnostic system.

A more precise analysis of the fault condition can be carried out from the observation of a possibly occurring second fault. Furthermore, a plausibility consideration of occurring faults is possible when, for example, quantities of the engine, which are monitored by the second diagnostic system, are correlated with quantities of the pressure system which are monitored by the first diagnostic system.

According to an especially advantageous embodiment of the invention, the additional diagnostic system is a diagnostic system of a mixture controller of the engine and the second fault is a mixture controller fault. The mixture controller controls the formation of an air/fuel mixture for the engine and detects, for example, also a lambda value (that is, the air/fuel mass ratio) which is present in the exhaust-gas system of the engine. With the aid of the lambda value or via the evaluation of a fault in the mixture controller, a fault, which is determined in the pressure system of the engine, can be limited or be subjected to a plausibility consideration. Such a fault in the mixture controller can, for example, be a lambda actual value which deviates greatly from the lambda desired value.

In a further embodiment of the invention, a conclusion as to a pressure sensor fault is not drawn with a pressure sensor system fault and simultaneous absence of the second fault. A fault of the pressure sensor usually causes incorrect pressure measurement values which are processed, for example, in the mixture controller and there lead to a fault in the mixture formation whereby the second fault, namely, a mixture controller fault arises. If such a mixture controller fault or second fault does not occur notwithstanding the presence of a pressure system fault, the probability is very low that there is a pressure sensor fault.

In a further embodiment of the invention, with a pressure system fault and simultaneous presence of a second fault (for example, a fault of a mixture controller), a conclusion is drawn as to a pressure sensor fault.

A further embodiment of the method of the invention is especially advantageous wherein a quantity, which corresponds to the second fault, is used for the purpose to more closely determine the pressure system fault. For example, from a mixture controller fault, data can be obtained as to whether the mixture composition is too rich (air deficiency) or is too lean (air excess) and from this data, with a pressure sensor fault, it can be determined as to whether the pressure sensor indicates pressure values which are too high or too low.

Of special significance is the realization of a method of the invention in the form of a computer program which is provided for a control apparatus of an internal combustion engine. Here, the computer program can be run especially on a microprocessor and is suitable for carrying out the method of the invention. In this case, the invention is realized via the computer program so that this computer program represents the invention in the same manner as the method which can be executed by the computer program. The computer program can be stored on an electric memory medium, for example, on a flash memory or a read-only memory.

As a still further solution of the task of the present invention, the use of the method is suggested in an internal combustion engine having direct injection. Here, the pressure sensor detects the fuel pressure in a high pressure fuel store from which fuel is injected into the combustion chambers of the engine via injection valves.

As an alternative to the above, the use of the method of the invention is also conceivable in intake manifold injection with a fuel system controlled as required. Faults of a low pressure sensor are analyzed with the aid of a low pressure loop diagnosis and, for example, a mixture controller diagnosis and/or are subjected to a plausibility consideration.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
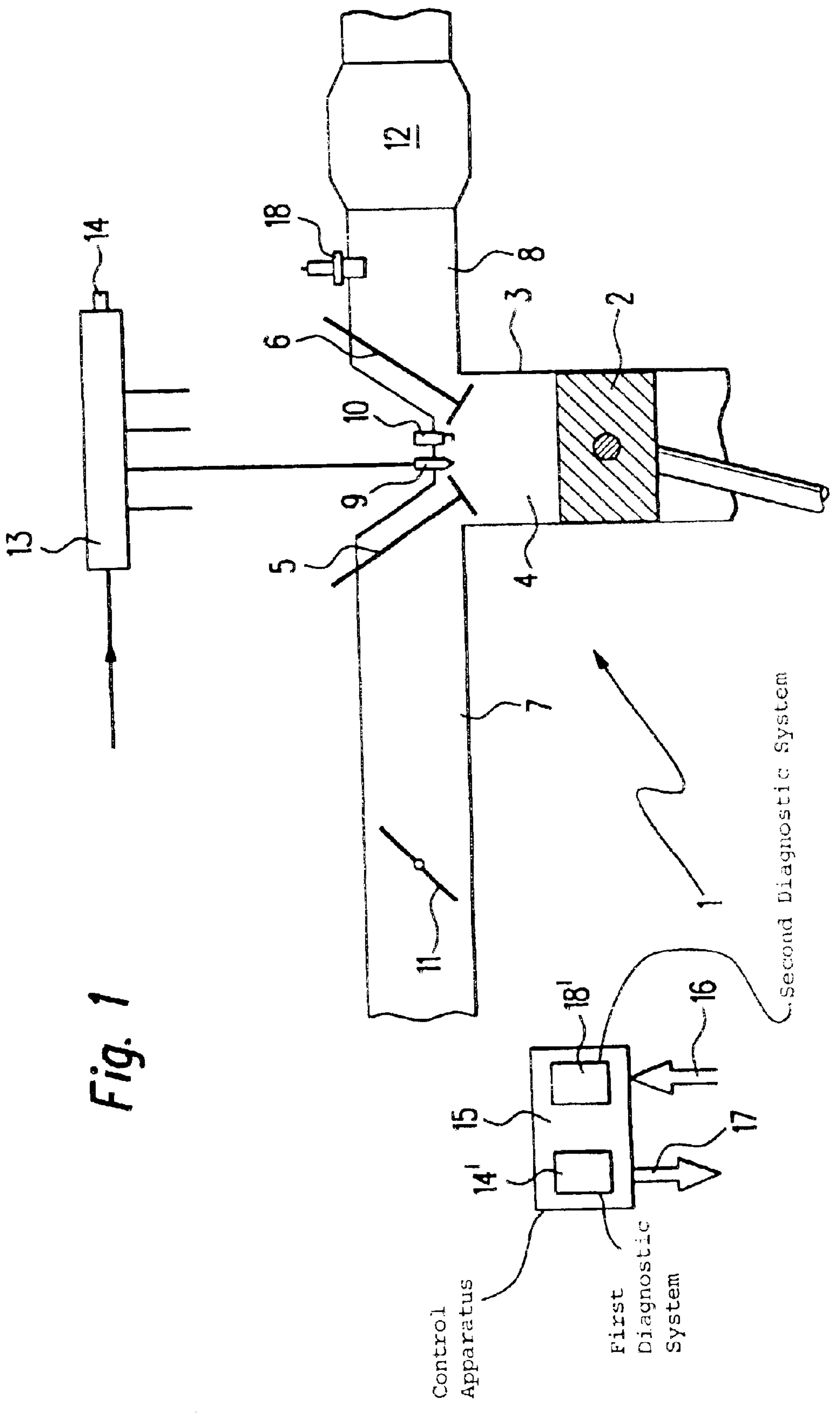
FIG. 1 is a schematic block circuit diagram of an embodiment of the internal combustion engine of the invention; and, FIG. 2 is a flowchart showing the method according to the invention.

In FIG. 1, an internal combustion engine 1 of a motor vehicle is shown wherein a piston 2 is movable back and forth in a cylinder 3. The cylinder 3 is provided with a combustion chamber 4 which, inter alia, is delimited by the piston 2, an inlet valve 5 and outlet valve 6. An intake manifold 7 is coupled by the inlet valve 5 and an exhaust-gas pipe 8 is coupled by the outlet valve 6. An injection valve 9 and a spark plug 10 project into the combustion chamber 4 in the region of the inlet valve 5 and of the outlet valve 6. Fuel can be injected into the combustion chamber 4 via the injection valve 9. The fuel in the combustion chamber 4 is ignited by the spark plug 10.

A rotatable throttle flap 11 is mounted in the intake manifold 7 via which air is supplied to the intake manifold. The quantity of the supplied air is dependent upon the angular position of the throttle flap 11. A catalytic converter 12 is accommodated in the exhaust-gas pipe 8 and functions for purifying the exhaust gases arising from the combustion of the fuel. In addition, a lambda probe 18 is disposed in the exhaust-gas pipe 8 between the outlet valve 6 and the catalytic converter 12. The measurement signal of the lambda probe 18 makes possible a conclusion as to a ratio of air mass and fuel mass in the exhaust-gas pipe 8. This ratio is also known as lambda.

The injection valve 9 is connected via a pressure line to a fuel store 13. In the same way, the injection valves of the other cylinders of the engine 1 are connected to the fuel store 13. The fuel store 13 is supplied with fuel via a feed line. For this purpose, a fuel pump is provided which is suitable for building up the wanted pressure in the fuel store 13.

Furthermore, a pressure sensor 14 is mounted on the fuel store 13 with which the pressure in the fuel store 13 can be measured. This pressure is the pressure which is applied to the fuel and with which the fuel is therefore injected via the injection valve 9 into the combustion chamber 4 of the engine 1.

During operation of the engine 1, fuel is pumped into the fuel store 13. This fuel is injected via the injection valves 9 of the individual cylinders 3 into the corresponding combustion chambers 4. With the aid of the spark plugs 10, combustions are generated in the combustion chambers 4 whereby a reciprocating movement is imparted to the pistons 2. These movements are transmitted to a crankshaft (not shown) and apply a torque to the crankshaft.

Input signals 16 are applied to a control apparatus 15 and these signals define operating variables of the engine 1 measured by means of sensors. For example, the control apparatus 15 is connected to the pressure sensor 14, an air mass sensor, the lambda probe 18, an rpm sensor and the like.

The control apparatus 15 generates output signals 17 with which the performance of the engine 1 can be influenced via actuators or positioning devices. For example, the control apparatus 15 is connected to the injection valve 9 and the spark plug 10 and generates the signals required for driving the latter.

The control apparatus 15 is provided, inter alia, to control (open loop and/or closed loop) the operating variables of the engine 1. For example, the fuel mass, which is injected by the injection valve 9 into the combustion chamber 4, is controlled by the control apparatus 15 especially with a view of obtaining a low fuel consumption and/or a low development of toxic substances. For this purpose, the control apparatus 15 is provided with a microprocessor which has a computer program stored therein in a memory medium, especially a flash memory.

This computer program is suitable to carry out the above-mentioned control (open loop and/or closed loop).

A first diagnostic system 14' is contained in the control apparatus 15 and is provided for the purpose of determining faults in the high pressure fuel system comprising essentially a fuel store 13 and a pressure sensor 14. These faults, which are characterized as pressure system faults, comprise, for example, that the fuel pressure, which is measured by the pressure sensor 14 in the fuel store 13, or a drive quantity which is used, for example, for driving the fuel pump or a comparable pressure actuating member, deviates too greatly from a precontrol value of the fuel pressure or that a pressure controller of the engine 1 can no longer adjust a specific desired pressure.

Furthermore, a second diagnostic system 18' of the engine 1 is present which is assigned to a mixture controller (not shown) and determines, for example, a mixture controller fault. In the present case, the mixture controller fault indicates that and by how much a drive quantity, which is outputted by the mixture controller, deviates from a corresponding precontrol quantity or that and by how much a lambda actual value, which is determined with the aid of the lambda probe 18, deviates from a lambda desired value which is pregiven by the mixture controller.

With respect to FIG. 2, it will be described hereinafter how a fault, which occurs in the engine 1 of FIG. 1, is analyzed in the pressure system or how a fault of the pressure sensor 14 itself is made the subject matter of a plausibility consideration.

In step 100, a test is first made as to whether a fault in the pressure system is determined by the first diagnostic system 14'. If this is not the case, then the program branches to the end and the method is carried out anew as may be required.

Figure 2:
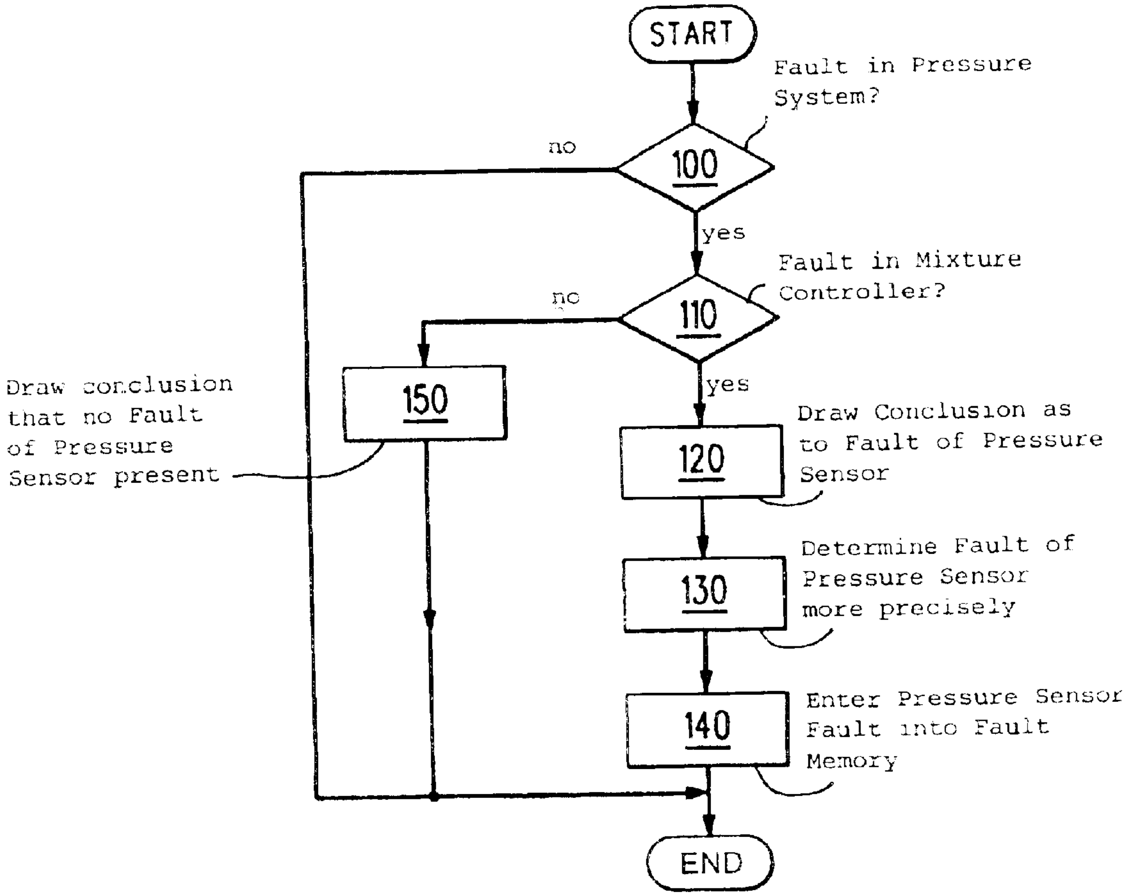

Otherwise, that is, for a fault in the pressure system, a check takes place in step 110 of FIG. 2 as to whether the diagnostic system 18' of the mixture controller determines a mixture controller fault. When a mixture controller fault is determined, a conclusion as to a fault of the pressure sensor 14 is drawn therefrom in step 120.

Thereupon, in step 130, the pressure sensor fault is determined more precisely. For this purpose, the deviation of the lambda desired value from the lambda actual value is applied or the deviation of the drive quantity, which is outputted by the mixture controller, from the corresponding precontrol quantity is applied from the mixture controller fault.

When the pressure sensor 14 indicates, for example, a fuel pressure which is less than the actual fuel pressure in the fuel store 13, an injection time is determined which, for example, is too long on the basis of this incorrect pressure value so that too much fuel is injected into the combustion chambers 4 of the engine and, compared to the input of the mixture controller, a mixture which is too rich arises, that is, the lambda actual value is less than the lambda desired value.

From this deviation between the lambda actual value and the lambda desired value, a conclusion is drawn that the pressure sensor indicates pressure values which are too low. Correspondingly, in step 140, a pressure sensor fault is read into a fault memory (not shown) of the control apparatus 15. The pressure sensor fault also contains data that the pressure sensor 14 indicates values which are too low.

From the deviation of the drive quantity, which is outputted by the mixture controller, from the corresponding precontrol quantity, a conclusion can also be drawn as to the above-mentioned pressure sensor fault when, for example, the mixture controller must continuously lean the air/fuel mixture, that is, when the fuel component, which is pregiven in accordance with the corresponding precontrol quantity, must be reduced in order to achieve the lambda desired value.

The mechanism of step 130 is also applicable when the pressure sensor 14 indicates pressure values which are too great. In this case, with a fault entry into the fault memory, also the data is stored in the same manner that the pressure sensor indicates pressure values which are too high.

Furthermore, the deviation between the lambda actual value and the lambda desired value, which is determined in step 130, can be used for correcting the mixture formation for the further operation of the engine 1.

When the diagnostic system 14' determines a fault in the pressure system and the inquiry in step 110 simultaneously yields that the diagnostic system 18' of the mixture controller determines no mixture controller fault, a conclusion is drawn in step 150 that no fault of the pressure sensor 14 is present. In this case, no pressure sensor fault is entered into the fault memory.

Another embodiment of the method of the invention is used with an internal combustion engine having manifold injection (not shown). This engine has a fuel pump, which is controlled in accordance with fuel need, and a low pressure sensor for detecting the fuel pressure. In the same way as in the method described with respect to FIG. 2, a mixture controller fault is observed when a fault occurs in the low pressure fuel system in order to subject a fault of the low pressure sensor to a plausibility consideration.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine including a pressure system, a first diagnostic system and a second diagnostic system, the method comprising the steps of:

detaining a fault of said pressure system having a pressure sensor with said first diagnostic system, wherein said pressure sensor determines said fault;

checking at least said second diagnostic system as to a second fault as a consequence of said pressure system fault determined with said first diagnostic system; and considering the plausibility of a fault of said pressure sensor.

2. The method of claim 1, wherein said second diagnostic system is a diagnostic system of a mixture controller of said engine and said second fault is a mixture controller fault.

3. The method of claim 1, comprising the further step of not drawing a conclusion as to a pressure sensor failure when there is a pressure system fault simultaneously with an absence of said second fault.

4. The method of claim 1, comprising the further step of drawing a conclusion as to a pressure sensor fault when there is a pressure system fault with a simultaneous presence of said second fault.

5. The method of claim 1, comprising the further step of using a quantity corresponding to said second fault in order to more closely determine said pressure system fault.

6. The method of claim 1, wherein said pressure system is a high pressure fuel system of said engine.

7. The method of claim 1, wherein said plausibility is considered via an evaluation of said second fault.

8. A control apparatus for an internal combustion engine having a first diagnostic system and a second diagnostic system, the control apparatus comprising:

means for detecting a fault of said pressure system with a pressure sensor by said first diagnostic system;

means for checking at least said second diagnostic system as to a second fault as a consequence of said pressure system fault detected by said first diagnostic system; and means for considering the plausibility of a fault of said pressure sensor.

9. The control apparatus of claim 8, wherein said pressure system is a high pressure fuel system of said engine.

10. An internal combustion engine comprising:

a pressure system having a pressure sensor;

a first diagnostic system and a second diagnostic system;

means for determining a first fault of said pressure system with said first diagnostic system;

means for checking for a second fault with said second diagnostic system when said first fault is determined via said first diagnostic system; and considering the plausibility of a fault of said means for determining said first fault.

11. A computer program for a control apparatus of an internal combustion engine including a pressure system, a first diagnostic system and a second diagnostic system, the computer program comprising a program suitable for carrying out a method for operating said internal combustion engine when executed on a computer and the method including the step of:

determining a fault of said pressure system having a pressure sensor with said first diagnostic system, wherein said pressure sensor determines said fault;

checking at least said second diagnostic system as to a second fault as a consequence of said pressure system fault determined with said first diagnostic system; and considering the plausibility of a fault of said pressure sensor.

12. The computer program of claim 11, wherein said pressure system is a pressure fuel system of said engine.

13. The computer program of claim 11, wherein the computer program is stored in an electric storage medium.

14. The computer program of claim 13, wherein said electric storage medium is a flash memory.

15. The computer program of claim 13, wherein said electric storage medium is a read-only-memory.

16. A method for operating an internal combustion engine having direct injection and including a pressure system, a first diagnostic system and a second diagnostic system, the method comprising the steps of:

determining a fault of said pressure system having a pressure sensor with said first diagnostic system, wherein said pressure sensor determines said fault;

checking at least said second diagnostic system as to a second fault as a consequence of said pressure system fault determined with said first diagnostic system; and considering the plausibility of a fault of said pressure sensor.

17. The method of claim 16, wherein said pressure system is a high pressure fuel system of said engine.

18. A method for operating an internal combustion engine including a pressure system, a first diagnostic system and a second diagnostic system, the method comprising the steps of:

determining a fault of said pressure system having a pressure sensor with said first diagnostic system:

checking at least said second diagnostic system as to a second fault as a consequence of said pressure system fault determined with said first diagnostic system; end considering the plausibility of said fault of said pressure system via an evaluation of said second fault.

19. The method of claim 18, wherein said pressure system fault is detected with said pressure sensor.

* * * * *

UNITED STATES PATENT AND TRADEMARK OFFICE

CERTIFICATE OF CORRECTION

PATENT NO. : 6,871,135 B2

DATED : March 22, 2005

INVENTOR(S) : Jens Wolber et al.

It is certified that error appears in the above-identified patent and that said Letters Patent is hereby corrected as shown below:

Column 5,

Line 30, delete “detaining” and insert -- determining -- therefor.

Column 6,

Line 20, delete “step” and insert -- steps -- therefor.

Line 61, delete “end” and insert -- and -- therefor.

Signed and Sealed this

Twenty-fourth Day of May, 2005

JON W. DUDAS

*Director of the United States Patent and Trademark Office*